United States Patent [19]
Amitani et al.

[11] Patent Number: 5,752,754
[45] Date of Patent: May 19, 1998

[54] CONTROL APPARATUS FOR ANTI-SKID BRAKE SYSTEM OF MOTOR VEHICLE

[75] Inventors: Mikio Amitani; Yasuo Naito, both of Tokyo, Japan

[73] Assignee: Mitsubishi Denki Kabushiki Kaisha, Tokyo, Japan

[21] Appl. No.: 690,826

[22] Filed: Aug. 1, 1996

[30] Foreign Application Priority Data

Mar. 19, 1996 [JP] Japan ................. 8-063197

[51] Int. Cl.⁶ ........................... B60T 8/00
[52] U.S. Cl. ........................... 303/199; 303/20
[58] Field of Search ................ 303/199, 156, 303/159, DIG. 4, 20; 364/424.03, 424.04, 426.01, 426.02

[56] References Cited

U.S. PATENT DOCUMENTS

| | | | |
|---|---|---|---|
| 3,650,575 | 3/1972 | Okamaoto | 303/156 |
| 3,652,132 | 3/1972 | Ando et al. | 303/159 X |

OTHER PUBLICATIONS

"Honda CR-V Service Manual, p. 13-B-4-5.".

*Primary Examiner*—Peter M. Poon
*Attorney, Agent, or Firm*—Oblon, Spivak, McClelland, Maier & Neustadt, P.C.

[57] ABSTRACT

A control apparatus for an anti-skid brake system of a motor vehicle can ensure operation of electromagnetic valves for actuating wheel brakes even when a battery voltage is low while ensuring a sufficient braking force for a motor vehicle even when an onboard battery of the motor vehicle is connected with reverse polarity. The apparatus includes a plurality of exciting coils (8a to 8h) provided in association with electromagnetic valves for controlling hydraulic circuits designed for operating front wheel brakes (11, 12) and rear wheel brakes (13, 14), a plurality of transistors (7a to 7h) each connected in series to each of the exciting coils (8a to 8h), a valve control unit (6) for generating on/off signals to the transistors (7a to 7h), a battery (1) for applying a DC voltage to the series circuits each constituted by the exciting coils (8a to 8h) and the transistors (7a to 7h), and diodes (9a to 9h) each disposed in a current path formed between the transistor (7a to 7h) and the exciting coil (8a to 8h) connected in series for blocking a reverse current flowing through the current path.

8 Claims, 6 Drawing Sheets

FIG. 6

CONTROL APPARATUS FOR ANTI-SKID BRAKE SYSTEM OF MOTOR VEHICLE

BACKGROUND OF THE INVENTION

1. Field of the Invention

The present invention relates generally to an anti-skid brake system for a motor vehicle for preventing wheels thereof from being locked up upon brake application to the motor vehicle. More particularly, the present invention is concerned with a control apparatus for such anti-skid brake system which apparatus can operate without fail even when a power source voltage becomes low and/or even when an onboard battery is connected erroneously with polarity reversed.

2. Description of Related Art

Figure 5:
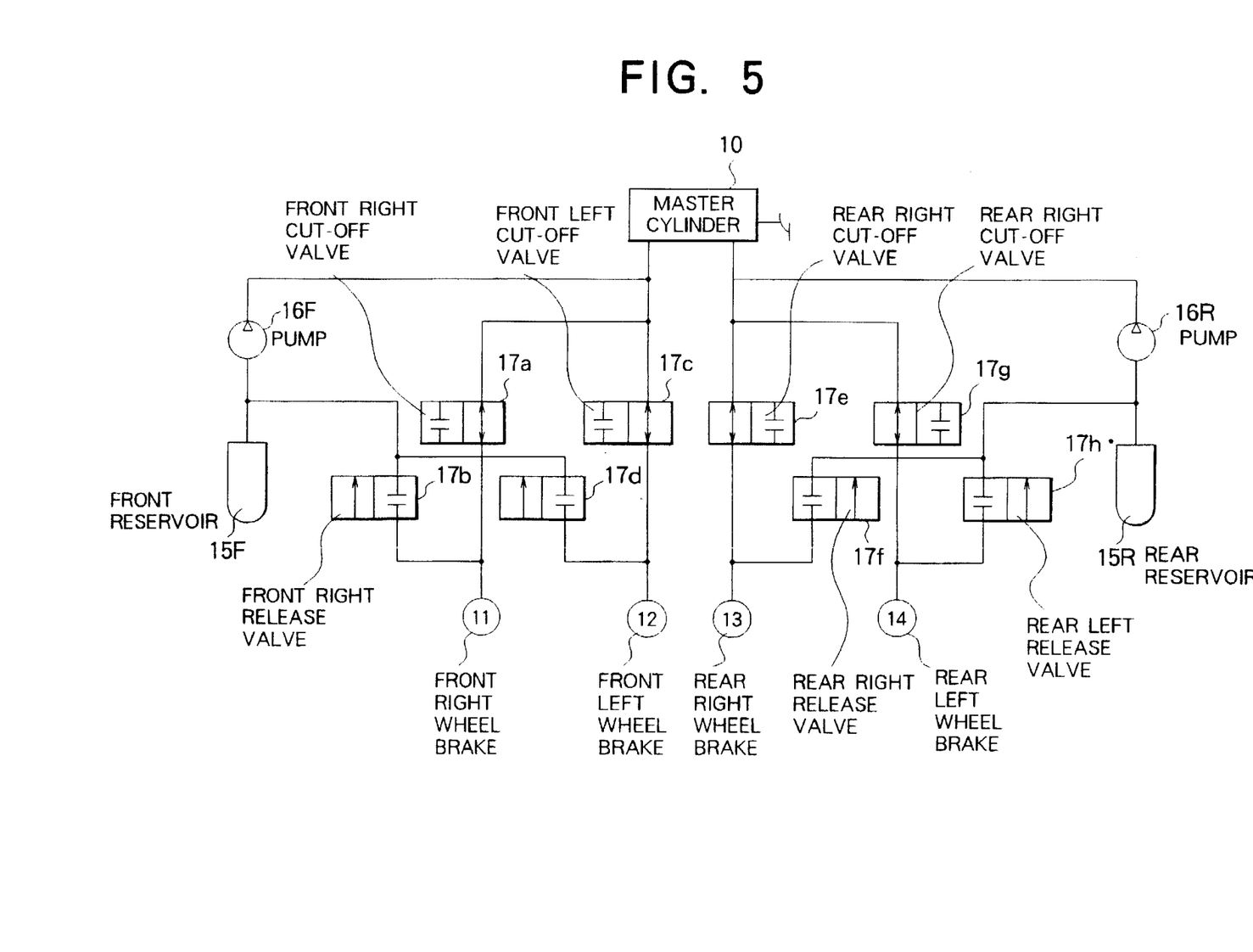
FIG. 5 is a schematic diagram showing a general arrangement of a conventional hydraulic-circuit type anti-skid brake system to which the present invention can be applied.

For having better understanding of the present invention, description will first be made of a conventional anti-skid brake system of hydraulic-circuit type and a control apparatus therefor which are known heretofore. FIG. 5 is a schematic diagram showing a general arrangement of a conventional hydraulic-circuit type anti-skid brake system. Referring to the figure, the anti-skid brake system includes a master cylinder 10 for feeding or supplying a hydraulic fluid (working fluid such as oil) to a brake 11 provided in association with a wheel mounted on a motor vehicle at a front right side thereof as viewed from a driver's cab (hereinafter, this brake 11 will also be referred to as the front right wheel brake and similar expressions will be used for describing other brakes), a front left wheel brake 12, a rear right wheel brake 13 and a rear left wheel brake 14 upon brake applying operation, a reservoir 15F provided in association with the front wheels for receiving the brake oil fed back from the front right wheel brake 11 and the front left wheel brake 12 (hereinafter, the above-mentioned reservoir will be referred to as the front reservoir 15F), a reservoir 15R provided in association with the rear wheels for receiving the brake oil fed back from the rear right wheel brake 13 and the rear left wheel brake 14 (hereinafter, this reservoir will be referred to as the rear reservoir 15R), and pumps 16F and 16R for feeding the brake oil from the front and rear reservoirs 15R and 15F, respectively, to the master cylinder 10.

Further, a front right cut-off valve 17a, a front left cut-off valve 17c, a rear right cut-off valve 17e and a rear left cut-off valve 17g are provided in oil feeding pipes extending from the master cylinder 10 to the front right wheel brake 11, the front left wheel brake 12, the rear right wheel brake 13 and the rear left wheel brake 14, respectively, for controlling the feeding or supply of the hydraulic fluid or oil to the brakes 11 to 14, respectively.

Additionally, installed in an oil feeding pipe extending between the front right wheel brake 11 and the front reservoir 15F is a front right release valve 17b for allowing the hydraulic brake pressure to be released from the front right wheel brake 11 to the front reservoir 15F.

Similarly, in an oil feeding pipe extending between the front left wheel brake 12 and the front reservoir 15F, there is installed a front left release valve 17d for allowing the hydraulic brake pressure to be released from the front left wheel brake 12 to the front reservoir 15F.

Furthermore, installed in an oil feeding pipe extending between the rear right wheel brake 13 and the rear reservoir 15R is a rear right release valve 17f which serves for releasing the hydraulic brake pressure from the rear right wheel brake 13 to the front reservoir 15F.

Besides, in an oil feeding pipe which extends between the rear left wheel brake 14 and the rear reservoir 15R, there is installed a rear left release valve 17h for releasing the hydraulic brake pressure from the rear left wheel brake 14 to the rear reservoir 15R.

The cut-off and release valves 17a to 17h mentioned above are each constituted by an electromagnetic valve which can be selectively opened or closed by electrically energizing or deenergizing an exciting coil provided in association with the valve, which will be described in detail later on.

Upon application of the anti-skid braking, the cut-off valve 17a, 17c, 17e or 17g provided in association with the wheel brake 11, 12, 13 or 14 for the wheel (not shown) to which the brake is to be applied is opened while the release valve 17b, 17d, 17f or 17h is closed.

On the other hand, when the brake release operation is to be effectuated, the cut-off valve 17a, 17c, 17e or 17g associated with the wheel brake 11, 12, 13 or 14 for the wheel for which the brake is to be released is closed to thereby cut off or intercept the hydraulic pressure supply from the master cylinder 10, whereas the associated release valve 17b, 17d, 17f or 17h is opened to thereby vent the hydraulic pressure from the corresponding wheel brake to the front or rear reservoir 15F or 15R with the pump 16F or 16R being operated to feed the brake oil to the master cylinder 10 from the reservoir 15F or 15R. By performing repetitionally the brake applying operation and the brake releasing operation mentioned above, the anti-skid brake operation can be realized while protecting the wheels from being locked up.

Figure 6:
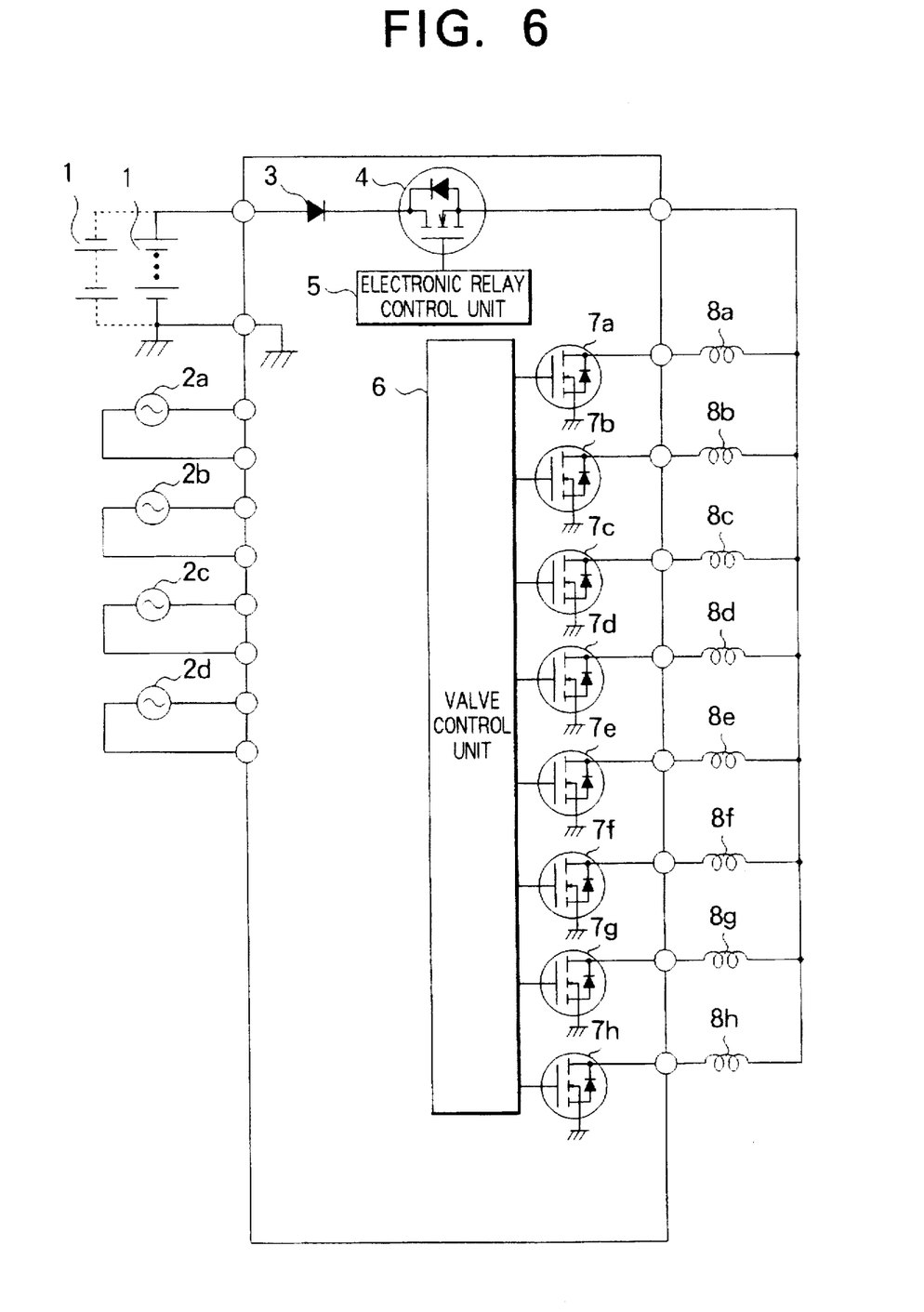
FIG. 6 is a schematic diagram showing a configuration of a hitherto known control apparatus for the anti-skid brake system shown in FIG. 5.

As the control apparatus for the anti-skid brake system of the motor vehicle which is designed for preventing the wheel(s) from being locked up by controlling the valves 17a to 17h provided in association with the wheel brakes 11 to 14 to thereby effectuate the brake control for the individual wheels of the motor vehicle, a control apparatus such as shown in FIG. 6 is known. As can be seen in the figure, this conventional control apparatus includes wheel speed sensors 2a to 2d for detecting the speeds of the respective wheels, exciting coils 8a to 8h of the valves 17a to 17h (see FIG. 5) provided pairwise in correspondence to the individual wheels, and a battery 1 serving as a power supply source for supplying an excitation current selectively to the exciting coils 8a to 8h.

More specifically, a series connection of a diode 3 and a transistor 4 which serves as an electronic relay is inserted between a plus-electrode of the battery 1 and a common terminal to which one end of all the exciting coils 8a to 8h are connected in common. The transistor 4 has a gate electrode to which an electronic relay control unit 5 is connected. Further, there are provided internally of the control apparatus a valve control unit 6 for performing on/off (close/open) control selectively for the valves 17a to 17h by electrically energizing selectively the exciting coils 8a to 8h in dependence on the outputs of the wheel speed sensors 2a to 2d and transistors 7a to 7h provided in association with the exciting coils 8a to 8h, respectively, for controlling the energizing current or excitation current thereof.

The transistors 7a to 7h have respective gate electrodes connected to output terminals of the valve control unit 6, wherein drain electrodes of the transistors 7a to 7h are connected to one end of the exciting coils 8a to 8h, respectively, with the source electrodes of the transistors 7a to 7h being grounded (i.e., connected to the ground potential). The electronic relay control unit 5 incorporated in the control apparatus shown in FIG. 6 is so designated as to apply turn-on (closing) signal to the gate of the transistor 4 upon anti-skid control to thereby allow an excitation current to flow to the exciting coils 8a to 8h from the battery 1 via the series circuit of the diode 3 and the transistor 4. At this junction, it should be mentioned that a diode is inserted backwardly between the drain and the source of the transistors 4 as well as each of the transistors 7a to 7h for protecting those transistors against a reverse current.

Next, description will turn to operation of the conventional anti-skid brake system and the control apparatus therefor.

Upon starting operation of the motor vehicle, the electronic relay control unit 5 supplies a turn-on signal to the transistor 4 which responds thereto by assuming an on-state (conducting state), whereby there is established such a state in which the excitation current can flow to the exciting coils 8a to 8h from the battery 1 by way of the series connection of the diode 3 and the transistor 4.

When the valve control unit 6 detects the wheel lock-up state on the basis of the output signals of the wheel speed sensors 2a to 2d provided for detecting the rotation speeds of the associated wheels during operation of the motor vehicle, the valve control unit 6 outputs an on signal to the exciting coils of the valves associated with the wheel being locked for thereby controlling these valves.

In this conjunction, let's assume, by way of example only, that the right front wheel be released from the locked-up state. In that case, the valve control unit 6 turns on the transistor 7a (i.e., switches the transistor 7a to the conducting state) to thereby electrically energize the exciting coil 8a. As a result, the front right cut-off valve 17a is set to the closed state. Consequently, supply or feeding of the hydraulic fluid to the front right wheel brake 11 from the master cylinder 10 is interrupted, whereby the front right wheel of the motor vehicle is released from the brake-applied state.

At the same time, the valve control unit 6 turns on the transistor 7b to electrically energize the exciting coil 8b, whereby the front right release valve 17b is operated to the opened state. As a result of this, the hydraulic pressure of the front right wheel brake 11 is fed to the front reservoir 15F. Thus, the brake release state is validated.

Operation of the diode 3 connected forwardly between the battery 1 and the source of the transistor 4 will now be elucidated. For convenience of the description, let's suppose that the diode 3 is not provided. In that case, if the battery 1 should erroneously be connected with the polarity being reversed, (as indicated by phantom lines in FIG. 6) upon exchange of the consumed battery with a fresh one, then currents will flow along current paths which extend through internal diodes formed intrinsically by source regions and drain regions of the transistors 7a to 7h, respectively, the exciting coils 8a to 8h and the internal diode formed by source and drain regions of the transistor 4 reversely from the ground potential to the battery 1.

In this conjunction, it can be appreciated that the transistors 7a to 7h may possibly be destroyed by such reverse currents which flow through these transistors upon polarity-reversed connection of the battery 1, as mentioned above, because each of the transistors 7a to 7h is usually incapable of withstanding such reverse current. In that case, if all the transistors 7a to 7h are destroyed, then all the cut-off valves 17a, 17c, 17e and 17g assume the opened state, which will result in that the hydraulic fluid flows to the reservoirs 15F and 15R from the individual wheel brakes. Consequently, the motor vehicle will assume most undesirably such a state that all the brakes thereof can no more be applied. Thus, when the motor vehicle runs on a road sloping downwardly, the motor vehicle may run uncontrollably.

With a view to coping with the situation mentioned above, the diode 3 having a large capacity is inserted between the plus-polarity terminal of the battery 1 and the source electrode of the transistor 4, as shown in FIG. 6. With this arrangement, the diode 3 prevents or blocks the current tending to flow through the excitation currents in the backward or reverse direction to thereby protect the transistors 7a to 7h from being destroyed. Additionally, by providing the diode 3 in the manner as mentioned above, such situation in which all the valves 17a to 17h are electrically energized due to short-circuit fault or destruction of the transistors 7a to 7h, to thereby render the braking operation ineffective can be prevented.

As can be seen from the foregoing, a diode of a large capacity is inserted forwardly in the electric power supply line for the electronic relay with a view to protecting the transistors from destruction and ensuring the braking operation notwithstanding of erroneous connection of the battery with polarity reversed. However, the conventional control apparatus in which a high-capacity diode (such as the diode 3) is inserted in a power supply line for the electronic relay (such as the transistor 4) in an effort to prevent the electromagnetic or solenoid valves from being actuated upon polarity-reserved connection of the onboard battery of the motor vehicle suffers nevertheless problems mentioned below.

It is first to be mentioned that the voltage applied to the exciting coils is equivalent to a battery voltage minus a voltage drop across the diode 3. Accordingly, the voltage applied to the exciting coils is lower than the battery voltage (i.e., power source voltage). In that case, the magnetomotive force of the exciting coils will be lowered. This means that the battery voltage has to be increased in order to ensure the anti-skid brake control without fail.

In addition, it is to be noted that the diode 3 must have a large capacity in order to allow a sufficient energizing current to flow through the individual exciting coils, which in turn means that the diode 3 has to be of a large current capacity and hence voluminous. Consequently, implementation of the anti-skid brake system control apparatus is undesirably accompanied with expensiveness and a problem that the control apparatus is difficult to implement in a miniature structure.

SUMMARY OF THE INVENTION

In the light of the state of the art described above, it is an object of the present invention to provide a control apparatus for an anti-skid brake system of a motor vehicle which apparatus can ensure positive operation of the brake control electromagnetic valves even when a source voltage (battery voltage) is lowered.

It is another important object of the present invention to provide a control apparatus for an anti-skid brake system of a motor vehicle which apparatus is capable of ensuring a sufficient braking force for a motor vehicle even when a power supply source or an onboard battery of the motor vehicle is connected with reverse polarity.

In view of the above and other objects which will become apparent as the description proceeds, there is provided according to a general aspect of the present invention an improved control apparatus for an anti-skid brake system of a motor vehicle. The apparatus includes a plurality of exciting coils provided in association with electromagnetic valves for controlling hydraulic circuits designed for operating front wheel brakes and rear wheel brakes, a plurality of switching elements each connected in series to each of the exciting coils, a valve control means for generating on/off signals to the switching elements, a power supply means for applying a DC voltage to the series circuits constituted by the exciting coil and the switching element, and a reverse current blocking means disposed in a current path formed between the switching element and the exciting coil connected in series to the switching element for blocking a reverse current flowing through the current path.

With the arrangement of the control apparatus for the anti-skid brake system described above, an ordinary braking force can be ensured for the motor vehicle even in the case where the onboard battery constituting the power supply source is erroneously connected with reverse polarity.

In a preferred mode for carrying out the invention, the reverse current blocking means may be so arranged as to prevent or block the reverse current flowing to the exciting coils of the electromagnetic valves which control either the hydraulic circuit for driving the front wheel brakes or the hydraulic circuit for driving the rear wheel brakes.

By virtue of the arrangement mentioned above the hydraulic circuit for either the front wheel brakes or the rear wheel brakes can be operated even in the case of erroneous connection of the battery with reverse polarity, to thereby ensure an ordinary brake application for the motor vehicle. The above arrangement is further advantageous in that the control apparatus can be implemented inexpensively in a simplified structure.

In another preferred mode for carrying out the invention, the reverse current blocking means may be so arranged as to prevent or block the reverse current flowing to the exciting coils of the electromagnetic valves designed for cutting off a hydraulic fluid in the hydraulic circuit.

Owing to the arrangement mentioned above, an ordinary braking force can be assured for the motor vehicle with a much simplified structure of the control apparatus and hence the anti-skid brake system.

In a further preferred mode for carrying out the invention, the reverse current blocking means may include a diode inserted forwardly between the exciting coil and the switching element.

By virtue of the above-mentioned arrangement, the valves provided with the exciting coils for which no diode is inserted can operate with high reliability even when the battery voltage is lowered for some reason. Besides, the control apparatus for the anti-skid brake system can be implemented inexpensively in a miniaturized structure, to further advantage.

Further, the reverse current blocking means may be constituted by a diode inserted forwardly between the switching element and the power supply means.

With the arrangement mentioned above, the valves provided with the exciting coils for which no diode is inserted can operate with high reliability even when the battery voltage is lowered for some reason. Additionally, the control apparatus for the anti-skid brake system can be implemented inexpensively in a miniaturized structure, to further advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "front", "rear", "forwardly", "backwardly" and the like are words of convenience and are not to be construed as limiting terms.

Embodiment 1

Figure 1:
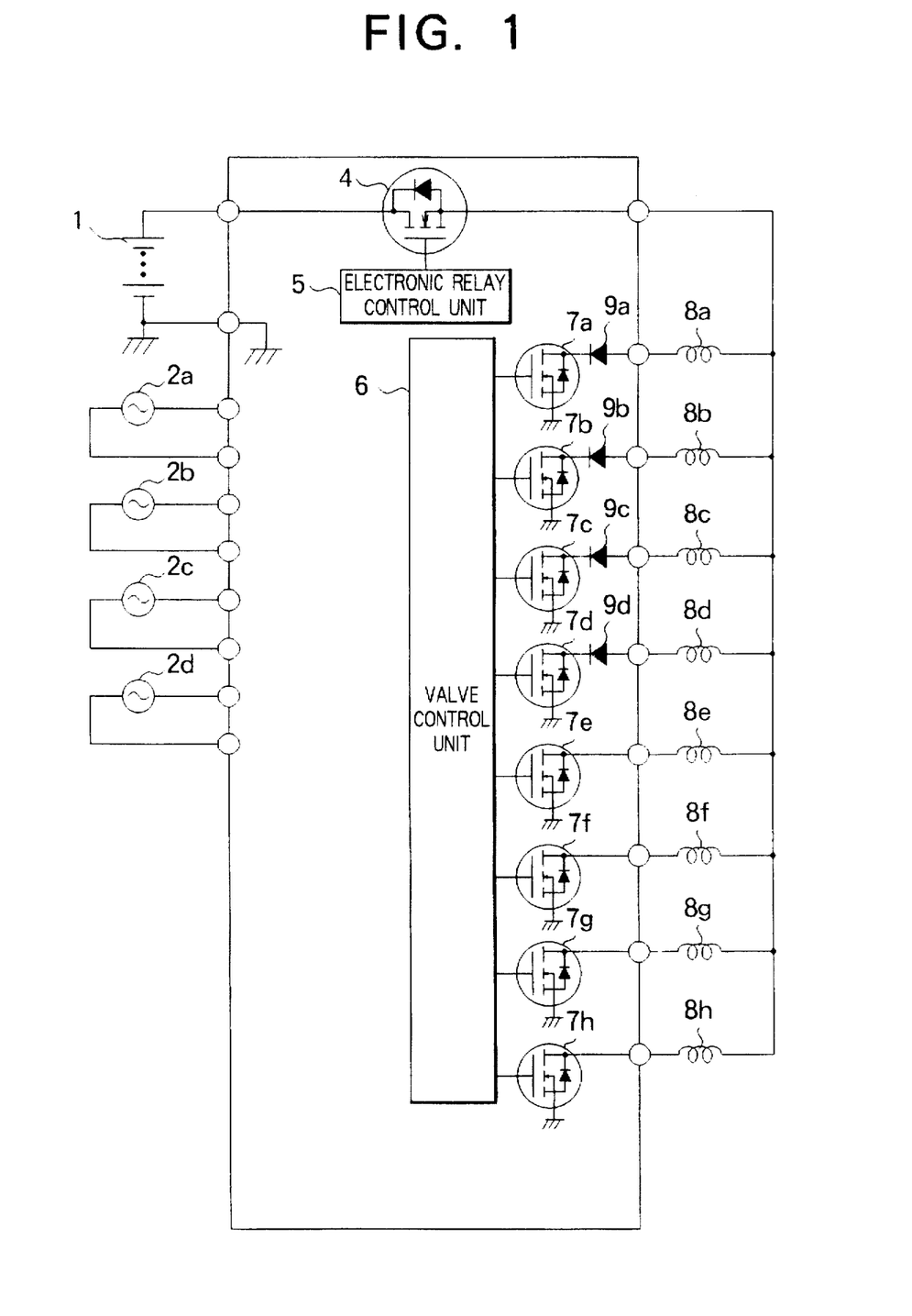
FIG. 1 is a schematic diagram showing a configuration of a control apparatus for an anti-skid brake system of a motor vehicle according to a first embodiment of the present invention.

FIG. 1 is a schematic diagram showing a configuration of a control apparatus for an anti-skid brake system of a motor vehicle according to a first embodiment of the invention, wherein the anti-skid brake system including hydraulic circuits can be implemented in a same structure as that of the conventional anti-skid brake system described hereinbefore by reference to FIG. 5. Further, in FIG. 1, components same as or equivalent to those shown in FIG. 6 are denoted by like reference characters. In the control apparatus for the anti-skid brake system of a motor vehicle according to the instant embodiment of the invention, the diode 3 of a large capacity connected in series to the power supply or battery 1 for the electronic relay 4, as described previously by reference to FIG. 6, is spared, wherein diodes 9a to 9d each of a smaller capacity than the diode 3 and serving as reverse current preventing or blocking means are inserted in a forward direction in current paths extending between one end of the exciting coils 8a to 8d of the cut-off and release valves 17a to 17d for the front wheel brakes and the drain electrodes of the transistors 7a to 7d which are adapted for driving the exciting coils 8a to 8d provided in association with the cut-off and release valves 17a, 17b, 17c and 17d for the front wheels brakes, respectively. In respect to the arrangement mentioned just above, the control apparatus for the anti-skid brake system according to the instant embodiment of the invention differs from the hitherto known control apparatus described hereinbefore by reference to FIG. 6.

Next, description will be made of operation of the control apparatus for the anti-skid brake system by reference to FIG. 1 together with FIG. 5. It is assumed, by way of example, that the front right wheel brake 11 is to be released. In that case, the transistor 4 is turned on under the control of the electronic relay control unit 5, whereupon the transistors 7a and 7b are set to the conducting state under the control of the valve control unit 6. Then, a current flows from the battery 1 to the ground by way of the exciting coil 8a for the front right cut-off valve 17a (see FIG. 5), the diode 9a and the transistor 7a. Besides, a current flows to the ground from the battery 1 via the exciting coil 8b for the front right release valve 17b (see FIG. 5), the diode 9b and the transistor 7b.

Consequently, the front right cut-off valve 17a of the anti-skid brake system in FIG. 5 is closed, whereby the oil supply to the front right wheel brake 11 from the master cylinder 10 is interrupted, while the front right release valve 17b constituting another part of the anti-skid brake system is opened to allow the brake oil to flow to the front reservoir 15F from the front right wheel brake 11, whereby the brake pressure applied for the front right wheel is released.

In this conjunction, it should be noted that in order to prevent occurrence of such situation that all the wheels of the motor vehicle are released from the brake application even when the battery 1 is connected with wrong or reverse polarity, the brake application at least for the front wheels can be ensured according to the teachings of the invention incarnated in the instant embodiment. More specifically, it is assumed that the battery 1 is connected erroneously with reverse polarity, as indicated by phantom line in FIG. 6. In that case, unless the diode 9a is provided, a current will flow to the exciting coil 8a for the front right cut-off valve 17a via an internal diode existing inherently in the transistor 7a, to thereby close the front right cut-off valve 17a. However, because of the presence of the diode 9a, the current mentioned above is positively prevented. Consequently, the front right cut-off valve 17a can remain in the opened state to allow the brake oil to flow to the front right wheel brake 11, even in the case of erroneous or polarity-reversed connection of the battery.

Furthermore, in the above-assumed case, a current will flow also to the exciting coil 8b for the front right release valve 17b via an internal diode formed intrinsically in the transistor 7b if the diode 9b is not provided. However, such current flow can positively be prevented by the diode 9b. For this reason, the front right release valve 17b can remain in the closed state. As a consequence, the brake oil can not flow to the front reservoir 15F from the front right wheel brake 11, whereby the brake pressure applied to the front right wheel brake 11 is prevented from being released. In this manner, an ordinary brake force can be ensured for the motor vehicle by the anti-skid brake system even when the battery 1 is connected with wrong or reverse polarity (i.e., the plus electrode of the battery 1 is grounded with the minus electrode being connected to the control circuit).

Similarly, with regard to the front left wheel brake 12, a current which tends to flow to the exciting coil 8c for the front left cut-off valve via an internal diode incorporated intrinsically in the transistor 7c can be prevented by the diode 9c. As a result, the front left cut-off valve 17c can remain in the opened state to thereby allow the brake oil to flow to the front left wheel brake 12. At the same time, a current tending to flow to the exciting coil 8d for the front left release valve via a diode formed internally of the transistor 7d upon polarity-reversed connection of the battery 1 is prevented by the diode 9d.

Thus, notwithstanding of the polarity-reversed connection of the battery 1, the front left release valve 17d remains in the closed state, as a result of which there can be avoided such situation that the brake oil flows to the front reservoir 15F from the front left wheel brake 12 to thereby release the brake pressure applied to the front left wheel brake 12. In this manner, the brake application can be held effective.

By employing the transistors 7a to 7d each having a capacity for withstanding the reverse current, they can be protected against destruction even when the battery should be connected with reversed polarity. It will now be understood that in the control apparatus for the anti-skid brake system according to the instant embodiment of the invention, a braking force can be ensured for the motor vehicle even if the battery 1 should be connected with reverse polarity. Besides, the control apparatus can be implemented inexpensively in a miniature size because each of the diodes 9a to 9d may be of a small capacity.

On the other hand, no diode is inserted in any one of the drain paths of the transistors 7e to 7h which are employed for controlling the cut-off and release valves 17e, 17f, 17g and 17h provided in association with the rear wheels, respectively, of the motor vehicle. Thus, substantially same voltage as the battery voltage can be applied to each of the exciting coils 8e to 8h provided in association with the above-mentioned valves, respectively. Consequently, the magnetomotive force in these exciting coils 8e to 8h is essentially insusceptible to the influence of a voltage drop due to the diode(s), even when the battery voltage is low. Thus, there can be ensured more effective valve operation than in the conventional apparatus even in a state where the battery voltage is low.

Embodiment 2

In the case of the first embodiment of the invention, the anti-skid control apparatus is so implemented as to ensure the effectiveness of the front wheel brakes even upon polarity reversed connection of the battery 1. However, the object contemplated by the invention can equally be achieved by making effective the rear brakes.

Figure 2:
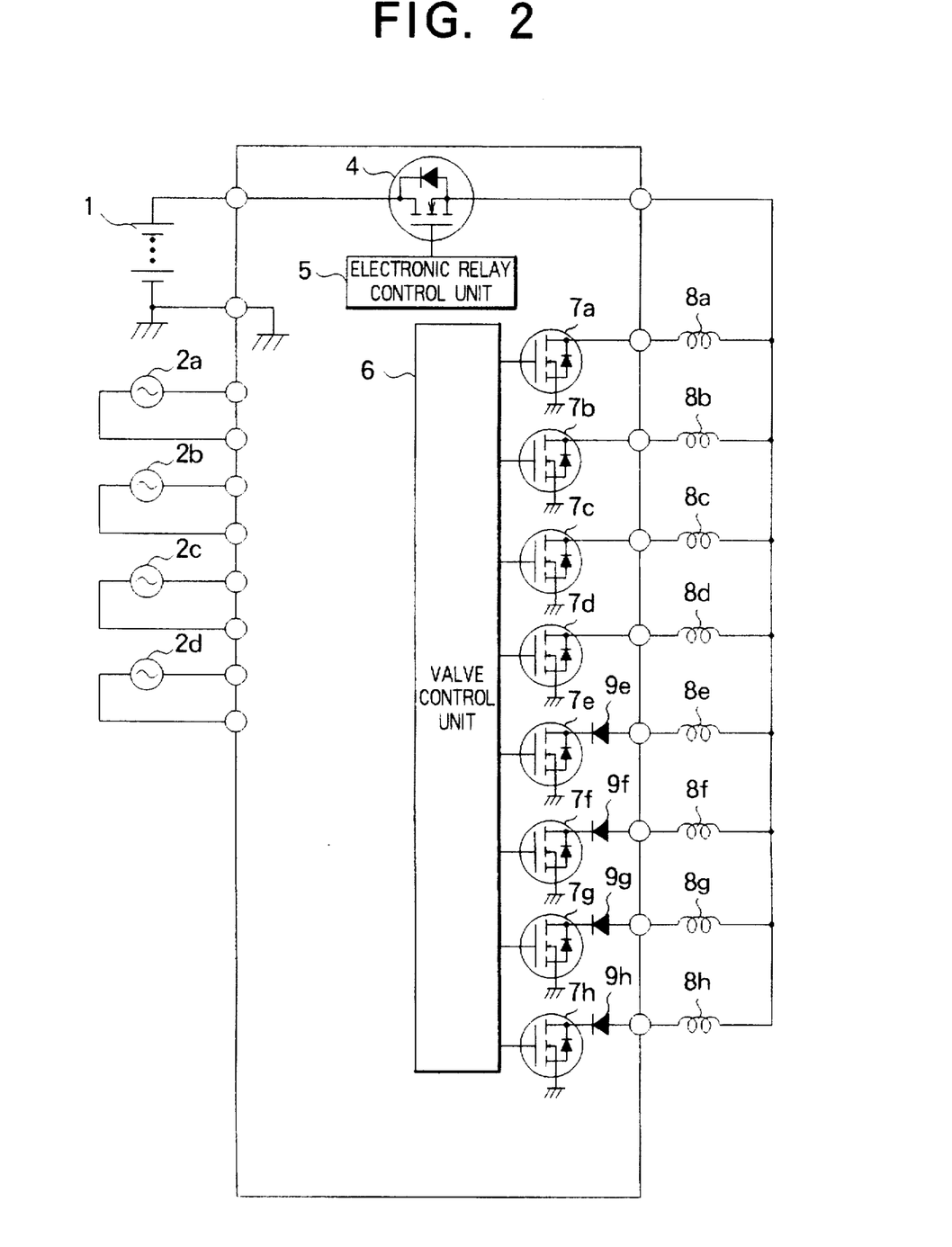
FIG. 2 is a schematic diagram showing a configuration of a control apparatus for the anti-skid brake system according to a second embodiment of the present invention.

FIG. 2 shows in a schematic diagram a configuration of the control apparatus for an anti-skid brake system of a motor vehicle according to a second embodiment of the invention, wherein the anti-skid brake system including hydraulic circuits can be implemented in a same structure as that of the conventional anti-skid brake system described hereinbefore by reference to FIG. 5. Further, in FIG. 2, components same as or equivalent to those shown in FIG. 1 are denoted by like reference characters. In the case of the control apparatus for the anti-skid brake system according to the first embodiment of the invention, the diodes 9a to 9d each of a smaller capacity than the diode 3 shown in FIG. 6 are inserted in a forward direction in current paths extending between one ends of the exciting coils 8a to 8d for the cut-off and release valves 17a to 17d provided in association with the front wheel brakes and the sources of the transistors 7a to 7d which are adapted for driving the exciting coils 8a to 8d provided in association with the cut-off and release valves 17a, 17b, 17c and 17d for the front wheels brakes, respectively.

By contrast, in the anti-skid control apparatus according to the second embodiment of the invention, the diodes 9e to 9h each of a smaller capacity than the diode 3 (see FIG. 6) are inserted in a forward direction in current paths extending between one ends of the exciting coils 8e to 8h of the cut-off and release valves 17e to 17h for the rear wheel brakes and the sources of the transistors 7e to 7h which are adapted for driving the exciting coils 8e to 8h provided in association with the cut-off and release valves 17e, 17f, 17g and 17h for the rear wheels brakes, respectively.

Operation of the control apparatus according to the instant embodiment will be described by reference to FIG. 2 together with FIG. 5. It is again assumed that the battery 1 is connected erroneously with reverse polarity. In that case, unless the diode 9e is provided, a current will flow to the exciting coil 8e for the rear right cut-off valve 17g via an internal diode of the transistor 7e, to thereby close the rear right cut-off valve 17e. However, because of the presence of the diode 9e, the current mentioned above is positively prevented. Consequently, the rear right cut-off valve 17e can remain in the opened state to allow the brake oil to flow to the rear right wheel brake 13, even in the case of polarity-reversed connection of the battery.

In the above-assumed case, a current will flow also to the exciting coil 8f for the rear right release valve 17f via an internal diode formed intrinsically in the transistor 7f if the diode 9f is not provided. However, such current flow can positively be prevented by the diode 9f. For this reason, the rear right release valve 17f can remain in the closed state. As a consequence, the brake oil can not flow to the rear reservoir 15R from the rear right wheel brake 13, whereby the brake pressure applied to the rear right wheel brake 13 is prevented from being released. In this manner, an ordinary brake force can be ensured for the motor vehicle even when the battery 1 is connected with wrong or reverse polarity.

Similarly, with regard to the rear left wheel brake 14, a current which tends to flow to the exciting coil 8g for the rear left cut-off valve 17g via an internal diode of the transistor 7g can be prevented by the diode 9g. As a result, the rear left cut-off valve 17g can remain in the opened state to allow the brake oil to flow to the rear left wheel brake 14.

At the same time, a current tending to flow to the exciting coil 8h for the rear left release valve 17h via an intrinsic diode of the transistor 7h upon polarity-reversed connection of the battery 1 is prevented by the diode 9h. Thus, notwithstanding of the polarity-reversed connection of the battery 1, the rear left release valve 17h remains in the closed state, as a result of which there can be avoided such situation that the brake oil flows to the rear reservoir 15R from the rear left wheel brake 14 to thereby release the brake pressure applied to the rear left wheel brake 14. In this manner, the brake application can be held effective.

By employing the transistors 7e to 7h each having a capacity for withstanding the reverse current, they can be protected against destruction even when the battery should be connected with reversed polarity. It will now be understood that in the control apparatus according to the instant embodiment of the invention, a braking force can be ensured for the motor vehicle even if the battery 1 should be connected with reverse polarity. Besides, the control apparatus can be implemented inexpensively in a miniature size because each of the diodes 9e to 9h may be of a small capacity.

On the other hand, no diode is inserted in any one of the drain paths of the transistors 7a to 7d which are employed for controlling the cut-off and release valves 17a, 17b, 17c and 17d provided in association with the front wheels, respectively, of the motor vehicle. Thus, substantially same voltage as the battery voltage can be applied to each of the exciting coils 8a to 8d, respectively. Consequently, the magnetomotive force in these exciting coils 8a to 8d is insusceptible to the influence of a voltage drop due to the diode(s), even when the battery voltage is low. Thus, there can be ensured more effective valve operation than in the conventional apparatus even in a state where the battery voltage is low.

Embodiment 3

According to the teaching of the invention incarnated in the first embodiment, operation of only the cut-off valves and the release valves which are provided in association with the front wheel brakes of the motor vehicle are inhibited or invalidated in case the battery 1 is connected with reverse polarity to thereby ensure the effectiveness of the front wheel brakes. However, the invention can equally be so realized that operation only of the cut-off valves for the front wheel brakes is disabled upon polarity-reversed connection of the battery 1.

Figure 3:
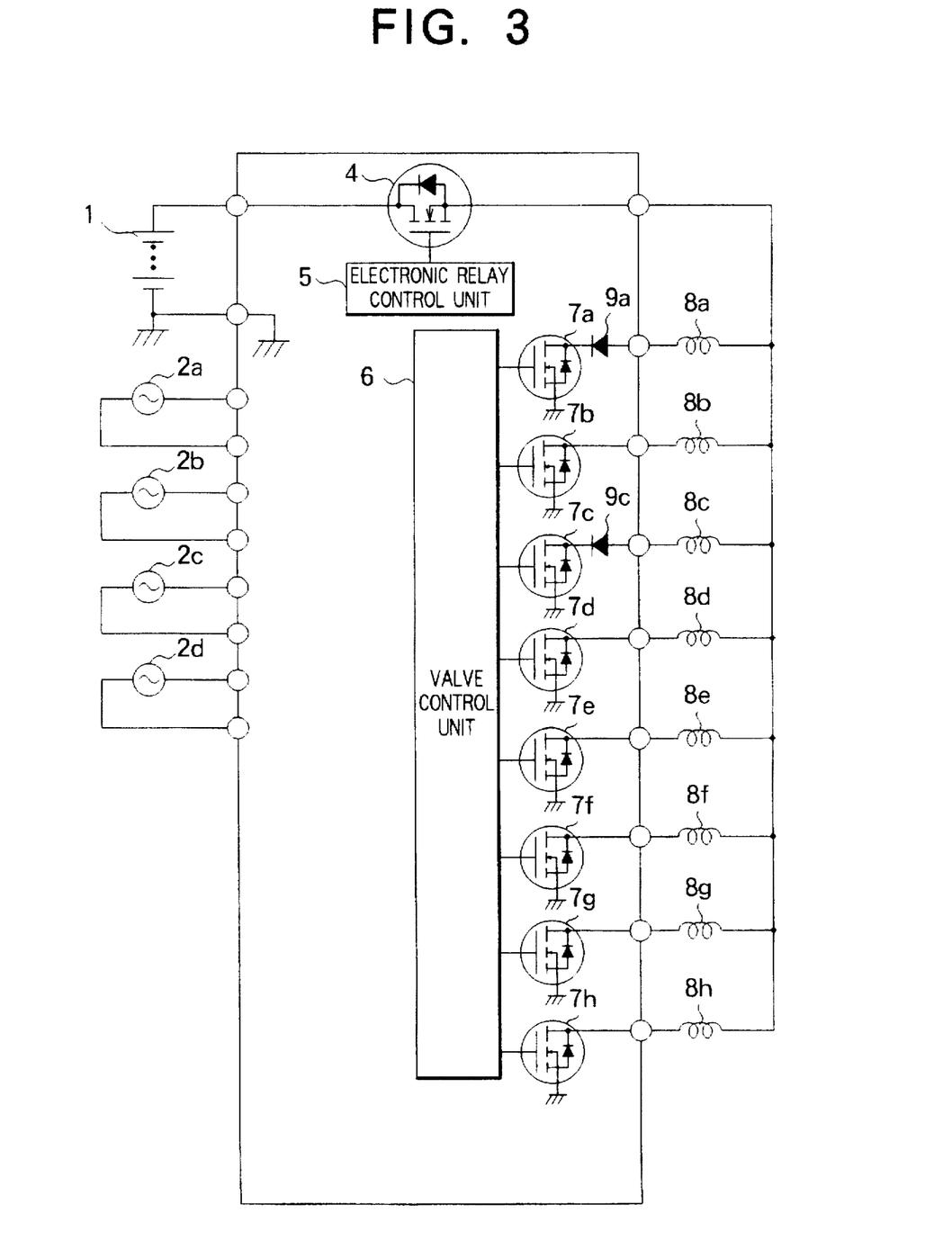
FIG. 3 is a schematic diagram showing a configuration of a control apparatus for the anti-skid brake system according to a third embodiment of the present invention.

FIG. 3 shows in a schematic diagram an arrangement of the control apparatus according to a third embodiment of the invention. This control apparatus differs from the first embodiment shown in FIG. 1 in that the diodes 9b and 9d are spared. In operation, even when the battery 1 is connected with reversed polarity (i.e., when the plus electrode of the battery is connected to the ground with the minus electrode thereof being connected to the circuit), a current which tends to flow to the exciting coil 8a for the front right cut-off valve 17a via an internal diode of the transistor 7a is blocked by the reverse current blocking diode 9a. Consequently, the front right cut-off valve 17a remains in the opened state to allow the brake oil to flow from the master cylinder 10 to the front right wheel brake 11. At this time point, although the front right release valve 17b is in the position to operate because of absence of the associated reverse current blocking diode, the pump 16F is inoperative. Accordingly, the pressure acting on the front right wheel brake 11 can not be released completely.

Further, in case the battery 1 is connected with reversed polarity, a current which can otherwise flow to the exciting coil 8c for the front left cut-off valve via an internal diode of the transistor 7c is blocked by the diode 9c. Consequently, the front left cut-off valve 17c can assume the opened state to allow the brake oil to flow from the master cylinder 10 to the front left wheel brake 12. At this time point, although the front left release valve 17d can operate, the pump 16F is inoperative. Accordingly, the pressure acting on the front left wheel brake 12 can not be removed completely.

As is apparent from the above description, when the battery 1 is connected with reverse polarity, the function of the front right wheel brake 11 as well as that of the front left wheel brake 12 will be degraded more or less. Nevertheless, the brake application itself can be ensured. Thus, braking can be effectuated for the motor vehicle. In the control apparatus for the anti-skid brake system according to the instant embodiment, the number of the small capacity blocking diodes as employed is smaller when compared with the diodes used in the apparatus of the first embodiment. Thus, the control apparatus can profitably be implemented more inexpensively in a further miniaturized structure when compared with the apparatus of the first embodiment.

Besides, it should be mentioned that because the reverse current blocking diodes are not inserted except for the exciting coils 8a and 8c for the front cut-off valves, a voltage which is substantially equal to the battery voltage is applied to the other valve actuating coils 8b and 8d. Thus, the magnetomotive force of these exciting coils 8b and 8d is insusceptible to the influence of the voltage drop due to the diode even in a low-voltage state of the battery 1, whereby there can be realized more positive valve operation when compared with the conventional apparatus, to further advantage.

Embodiment 4

In the case of the second embodiment, operation of only the cut-off valves and the release valves which are provided in association with the rear wheel brakes of the motor vehicle are inhibited or invalidated in case the battery 1 is connected with reverse polarity to thereby ensure the effectiveness of the rear wheel brakes. However, the invention can equally be so realized that operation only of the cut-off valves for the rear wheel brakes is disabled upon polarity-reversed connection of the battery 1.

Figure 4:
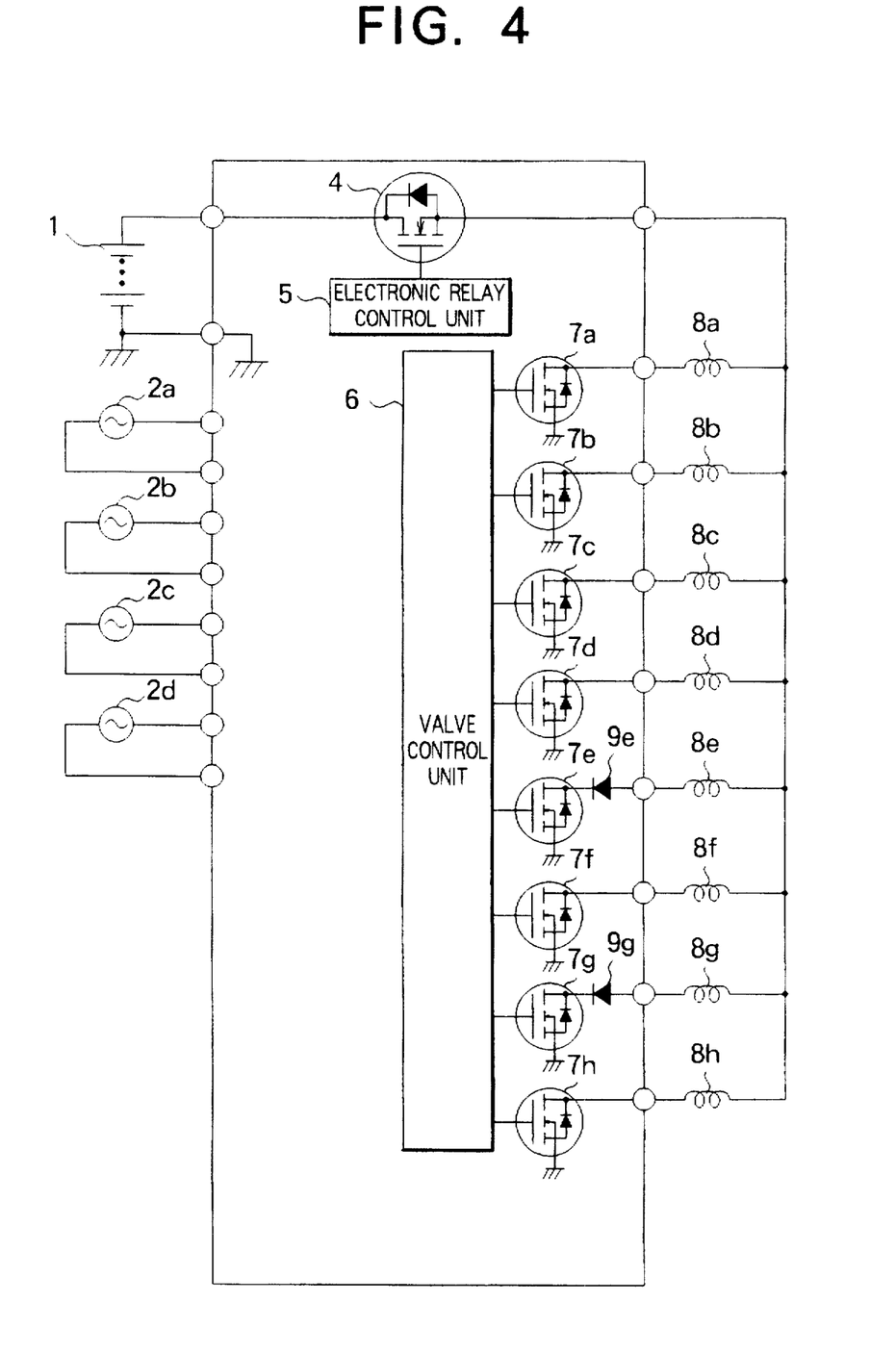
FIG. 4 is a schematic diagram showing a configuration of a control apparatus for the anti-skid brake system according to a fourth embodiment of the present invention.

FIG. 4 shows in a schematic diagram an arrangement of the control apparatus according to a fourth embodiment of the invention. This control apparatus differs from the second embodiment shown in FIG. 2 in that the diodes 9f and 9h are omitted. In operation, when the battery 1 is connected with reversed polarity, a current will tend to flow to the exciting coil 8e for the rear right cut-off valve 17e via an internal diode of the transistor 7e. However, such current is blocked by the reverse current blocking diode 9e. Consequently, the rear right cut-off valve 17e can remain in the opened state to thereby allow the brake oil to flow from the master cylinder 10 to the rear right wheel brake 13. At this time point, although the rear right release valve 17f is in the position to operate because of absence of the associated reverse current blocking diode, the pump 16R is inoperative. Accordingly, the pressure acting on the rear right wheel brake 13 can not be removed completely.

Further, in case the battery 1 is connected with reversed polarity, a current which can otherwise flow to the exciting coil 8g for the rear left cut-off valve via an internal diode of the transistor 7g is blocked by the diode 9g. Consequently, the rear left cut-off valve 17g can assume the opened state to allow the brake oil to flow from the master cylinder 10 to the rear left wheel brake 14. At this time point, although the rear left release valve 17h can operate, the pump 16R is inoperative. Accordingly, the pressure acting on the rear left wheel brake 14 can not be removed completely.

As is apparent from the above description, when the battery 1 is connected with reverse polarity, the function of the rear right wheel brake 13 as well as that of the rear left wheel brake 14 will be degraded more or less. Nevertheless, the brake application itself can be ensured. Thus, braking can be effectuated for the motor vehicle. In the control apparatus for the anti-skid brake system according to the instant embodiment, the number of the small capacity blocking diodes as employed is smaller when compared with the diodes used in the apparatus of the second embodiment. Thus, the control apparatus can profitably be implemented more inexpensively in a further miniaturized structure when compared with the apparatus of the second embodiment.

Besides, it should be mentioned that because the reverse current blocking diodes are not inserted except for the exciting coils 8e and 8g for the rear cut-off valves, a voltage which is substantially equal to the battery voltage is applied to the other valve actuating coils 8f and 8h. Thus, the magnetomotive force of these exciting coils 8f and 8h is not subject to any influence of the voltage drop due to the diode even in a low-voltage state of the battery 1, whereby there can be realized more positive valve operation when compared with the conventional apparatus, to further advantage.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the reverse current blocking diode is inserted between the valve actuating coil and the drain electrode of the transistor in the first to fourth embodiments described above. However, the diode may be inserted in the current path extending between the source electrode of the transistor and the ground potential of the control apparatus. Although the electronic relay control unit 5 and the valve control unit 6 have been described being implemented as discrete units, it goes without saying that both of them can be constituted by a single microprocessor.

Accordingly, all suitable modifications and equivalents may be resorted to, falling within the spirit and scope of the invention.

What is claimed is:

1. A control apparatus for an anti-skid brake system of a motor vehicle, comprising:

a plurality of exciting coils provided in association with electromagnetic valves for controlling hydraulic circuits designed for operating front wheel brakes and rear wheel brakes;

a plurality of switching elements each connected in series to each of said exciting coils;

valve control means for generating on/off signals to said switching elements;

power supply means for applying a DC voltage to the series circuits constituted by said exciting coils and said switching elements; and reverse current blocking means disposed in a current path formed between at least one of said switching elements and said exciting oil connected in series to said at least one of said switching elements for blocking a reverse current flowing through said current path.

2. A control apparatus for an anti-skid brake system according to claim 1, wherein said reverse current blocking means blocks the reverse current flowing to the exciting coils of the electromagnetic valves which control either the hydraulic circuit for driving the front wheel brakes or the hydraulic circuit for driving the rear wheel brakes.

3. A control apparatus for an anti-skid brake system according to claim 2, wherein said reverse current blocking means is adapted to block the reverse current flowing to the exciting coils of the electromagnetic valves designed for cutting off hydraulic fluid in said hydraulic circuit.

4. A control apparatus for an anti-skid brake system according to claim 1, wherein said reverse current blocking means includes a diode inserted forwardly between said exciting coil and said switching elements.

5. A control apparatus for an anti-skid brake system according to claim 1, wherein said reverse current blocking means includes a diode inserted forwardly between said switching element and said power supply means.

6. In an anti-skid brake system for a motor vehicle which includes:

a first valve groups of electromagnetic brake application valves and electromagnetic release valves provided in association with a first group of wheel brakes of said motor vehicle;

a second valve group of electromagnetic brake application valves and electromagnetic release valves provided in association with a second group of wheel brakes of said motor vehicle; and sensor means for detecting states of wheels of said motor vehicle;

a control apparatus, comprising:
- a first coil group of exciting coils for actuating said brake application valves and said release valves, respectively, which belong to said first valve group;
- a second coil group of exciting coils for actuating said brake application valves and said release valves, respectively, which belong to said second valve group;
- a first switch group of switching elements connected in series to said exciting coils, respectively, which belong to said first coil group;
- a second switch group of switching elements connected in series to said exciting coils, respectively, which belong to said second coil group;
- power supply means for supplying a DC voltage selectively to said exciting coils of said first and second coil groups under control of valve control means which controls selectively said switching elements of said first and second switch groups to thereby selectively energize said exciting coils belonging to said first and second coil groups in dependence on detection signal outputted by said sensor means; and
- reverse current blocking means disposed in current paths extending between at least one of said switching elements belonging to either one of said first and second switch groups and said exciting coils belonging to either one of said first and second coil groups, respectively, said switching elements and said exciting coils being those provided in association with at least said brake application valves, respectively, which belong to either one of said first valve group and said second valve group.

7. A control apparatus according to claim 6, wherein said first group corresponds to a group of front wheels of said motor vehicle, while said second group corresponds to a group of rear wheels of said motor vehicle.

8. A control apparatus according to claim 6, wherein each of said reverse current blocking means includes a diode inserted forwardly in said current path.

* * * * *